Feb. 5, 1929.
Re. 17,203
E. O. FLEEK
COLOR MIXER
Original Filed June 15, 1925
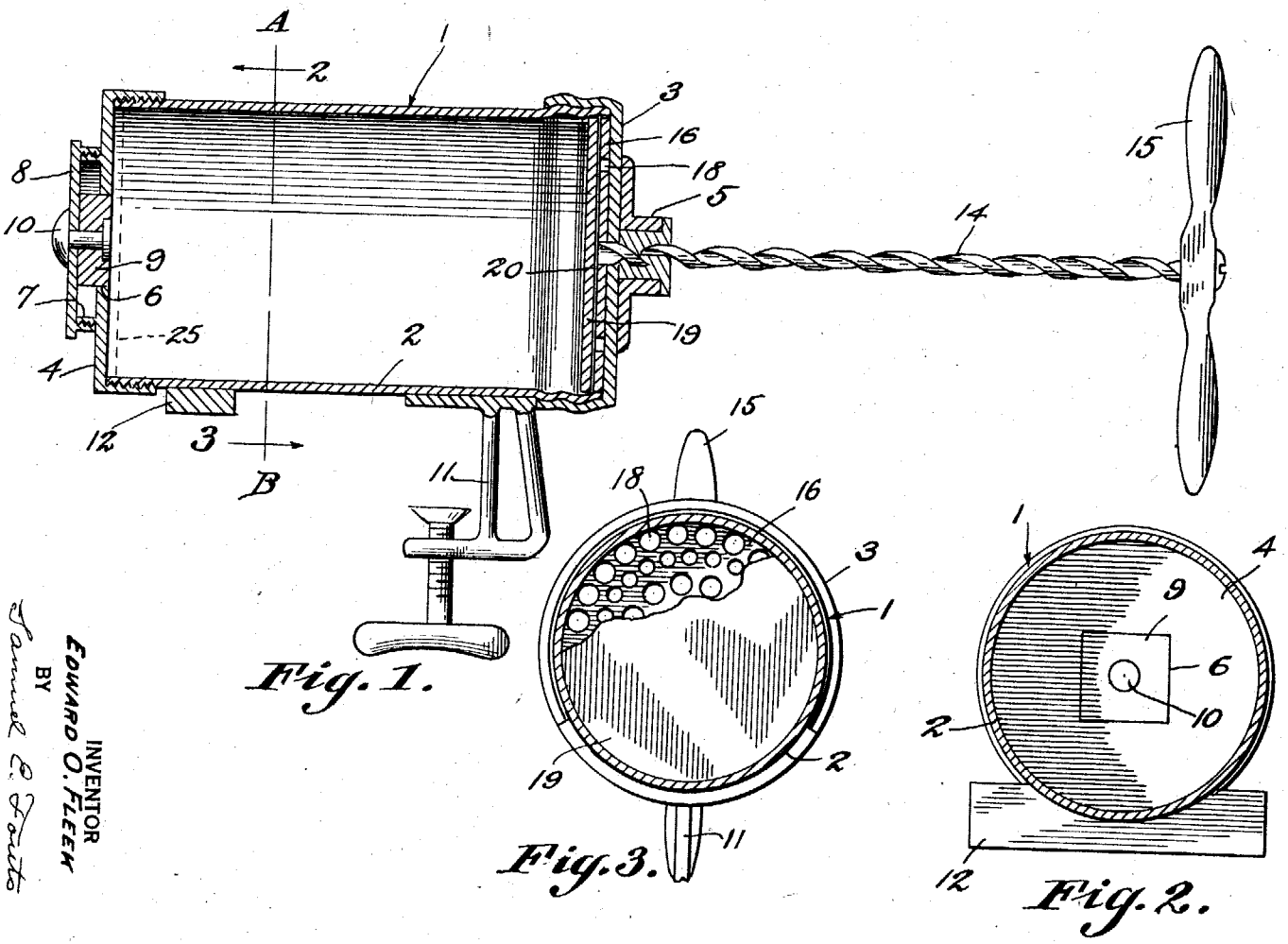
INVENTOR
EDWARD O. FLEEK
BY
Samuel E. Foutz
ATTORNEY Reissued Feb. 5, 1929.

Re. 17,203

UNITED STATES PATENT OFFICE.

EDWARD O. FLEEK, OF GLENDALE, CALIFORNIA.

COLOR MIXER.

Original No. 1,597,271, dated August 24, 1926, Serial No. 37,268, filed June 15, 1925. Application for reissue filed August 13, 1927. Serial No. 212,815.

This invention aims to provide a simple but novel means for mixing coloring matter with oleomargarine or a similar substance, novel means being provided whereby the material, having been colored, may be expelled in a strip of predetermined cross sectional contour.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the drawings:—

Figure 1 shows in longitudinal section a device constructed in accordance with the invention, parts being in elevation; Figure 2 is a cross section on the line A—B of Figure 1, looking in the direction of the arrow marked 2; Figure 3 is a cross section on the line A—B of Figure 1 looking in the direction of the arrow marked 3.

The numeral 1 designates a receptacle which may comprise a cylindrical body 2, the same having a uniform internal diameter throughout its length, a first cap 3 and a second cap 4 being held detachably, by threading or otherwise, on the respective ends of the body 2. The cap 3 has an elongated bearing 5. The cap 4 has an opening 6, which may be of rectangular outline, the cap 4 being supplied with an external neck 7, disposed about the opening 6, a carrier cap 8 being threaded on the neck 7. The opening 6 is stopped by a closure 9, in the form of a block, shaped to fit closely in the opening and to terminate flush with the end wall of the cylinder cavity. The closure 9 is held on the carrier 8 by a pivot element 10, the construction being such that although the closure 9 may be held against rotation in the opening 6, the cap or carrier 8, nevertheless, can be threaded on the neck 7. The receptacle is held on the edge of the table, or on any other accessible support, through the instrumentality of a clamp 11 carried by the body 2, and to hold the receptacle the more securely on a support, the body 2 is provided with a transverse foot 12.

An operating member is mounted for longitudinal movement in the receptacle 1 and may be in the form of a quick-thread screw 14 threaded into the bearing 5 of the first cap 3 and supplied at its outer end with a handle 15, a head 16, in the form of a disk, being secured to the inner end of the screw 14, the head being located within the receptacle 1 and having perforations 18. The head fits the cylinder snugly so as to be guided by it and leave no substantial film of material adhering to the cylinder walls as it is moved back and forth and rotates within the cylinder. The device comprises, also, an imperforate disk-like follower 19 adapted to be placed in the receptacle 1 in advance of the head 16, the follower carrying a pivoted handle 20 whereby the follower may be manipulated conveniently. When in place the follower abuts against the head so as to leave no substantial space therebetween.

The inner walls of the caps 3 and 4, which form the end walls of the cylinder cavity, are preferably in planes at right angles to the cylinder axis, as shown, and the side walls of the head are also in planes at right angles to said axis. It is essential that no substantial space be left between the cap and the head when the latter is moved to either end of the cylinder. Consequently, it is necessary that the inner surfaces of the end caps and the adjacent surfaces of the head lie in parallel planes.

Assume that the closure 9 is in place, as in Figure 1, that the receptacle 1 contains coloring matter and material to be colored, that the cap 3 is in place, that the head 16 is retracted, and that the follower 19 is omitted. Then, when the screw 14 is rotated by means of the handle 15, the screw will move longitudinally, causing the foraminous head 16 to reciprocate and rotate in the receptacle 1, the material to be colored and the coloring matter being squeezed back and forth through the perforations 18 of the head 16, until the coloring matter is distributed evenly through the material which is to be colored. Then, if the mixed material is to be ejected through the opening 6, the cap 3 is removed, and with it the head 16. The follower 19 is mounted in place in the receptacle 1, and the cap 3 is replaced. The device then appears as in Figure 1. The carrier 8 is detached, the closure 9 being withdrawn from the opening 6. If, now, the screw 14, the head 16 and the imperforate follower 19 be advanced, the colored material will be pressed out through the opening 6 in the form of a strip having a rectangular cross section, and the strip may be cut up into cubes of the common kind in which butter or oleomargarine is prepared for table use.

It will be understood that, as the head 16 moves longitudinally within the cylinder, it also rotates therein; that the material is forced through the several perforations 18 and that it forms back of each perforation in a spiral-shaped, rod-like body. Since the perforations are in concentric rows, the material issuing through the outer rows is twisted about the material issuing through the inner rows, with the result that, when the head reaches the end of the cylinder, the material has all been forced through the perforations and lies behind the head in a rope-like mass. Upon the return of the head, this mass is again compressed and a similar rope-like mass is formed on the opposite side of the head. As the head closely fits the sides of the cylinder and contacts closely with the caps when at the ends of its movements, all the material is subjected to the mixing action, with the result that the mixing of the material and the coloring matter is thorough and complete. It will be noted further that, due to the elongated bearing for the screw, a powerful thrust upon the material is made possible, while the close fit of the head within the cylinder assures that the thrust will be directly in the cylinder axis.

Among other combinations, the device comprises a receptacle 1 having an outlet 6, a removable closure 9 for the outlet, an operating member 14 movable in the receptacle, a mixing element 16 and an expelling element 19, both movable responsive to the operating member, the expelling element being removable at the will of the operator.

During the mixing operation, some prefer to leave off the cap 8 and the closure 9, and let the following disk 19 abut against the cap 4, as indicated in dotted lines in Figure 1.

I claim:—

1. A device for mixing plastic materials with coloring matter having a hollow body for containing the materials and the matter to be mixed, a cap for one end of the body, an elongated bearing having a threaded aperture therethrough at the center of said cap, and a threaded member fitting within said aperture and adapted, by being rotated, to move back and forth through said bearing, the combination of a head secured to said member to move back and forth within the body, and means connected with said member exterior of the body for rotating the same, the head being provided with a plurality of perforations and being of substantially the same diameter as the interior of the hollow body, whereby, as the head is moved back and forth from end to end of the body it is guided by the body and all the materials within the body are forced through the perforations in the head.

2. A device for mixing plastic materials with coloring matter having a hollow body and caps for closing the ends of said body, the combination of a perforated head adapted for movement longitudinally of the body, said head closely fitting the walls of said body, and means extending outside the body for moving the head back and forth, the inner surfaces of the end caps of the body and the adjacent surfaces of the head being parallel, whereby no substantial space is left between the head and the caps when the head is moved to either of its extreme positions.

3. A device of the character described having a hollow cylindrical body, caps for closing the ends of said body, an extended bearing at the center of one of said caps, said bearing having a threaded aperture therethrough and a threaded member extending through the aperture of said bearing, the combination of a perforated head secured to the said member within the body and movable longitudinally of the latter as the member is turned in the said bearing, the head extending transversely within the body and closely fitting the inner walls thereof and the inner surfaces of the caps and the adjacent surfaces of the head being parallel, and means for turning the threaded member, whereby, when the member is turned the head is turned and is moved back and forth within the body while substantially all the materials within the latter are forced through the perforations of the head and are mixed.

4. A structure such as specified in claim 3 and having means whereby it may be secured to a table or similar support with the axis of the body parallel to the surface of the table.

5. A device for mixing plastic materials with coloring matter having a hollow body, a cap for closing one end of the body, a mixing element within the body, and means extending through said cap for operating the mixing element, the combination of a second cap for closing the other end of the body, said second cap being provided with an opening through which the mixed materials may be forced, a removable closure for the opening, and means operable by the mixing element for forcing the materials through said opening when the closure is removed and the said element and forcing means are moved toward the opening.

6. A structure such as specified in claim 5 in which the second cap is provided with a neck, a threaded carrier member for screwing on said neck, and a closure pivotally mounted on said member and closing the opening in the second cap when the carrier member is in position.

7. A structure such as specified in claim 5 in which the means for operating the mixing element is a threaded rod which rotates as the same is moved back and forth through the cap and in which the mixing element is a perforated head secured non-rotatably on the rod, said head fitting snugly within the hollow body.

8. A device for mixing plastic materials with coloring matter having a hollow body, and a cap for closing one end of the body, the combination of a perforated head closely fitting the interior walls of the body, an extended bearing at the center of said cap, said bearing having a threaded aperture therethrough, a threaded member extending through the aperture of said bearing and secured to said perforated head, means whereby the threaded member may be turned within the bearing to move the perforated head back and forth within the body, a second cap for closing the other end of the body, said second cap being provided with an opening through which the mixed materials may be forced, a removable closure for the opening, and means operable by the perforated head for forcing the mixed materials through said opening when the closure is removed and the perforated head and forcing means are moved toward the opening.

9. A structure as specified in claim 8 in which the removable closure has its inner surface flush with the inner surface of the second cap.

10. A structure as specified in claim 8 in which the inner surfaces of the caps and the adjacent surfaces of the perforated head are parallel, for the purpose specified.

11. In a device of the class described having an opening in one end to facilitate clearing of the contained material therefrom, a removable closure for the opening, a perforated mixer, and means for reciprocating the mixer, the combination of an imperforate disk removably interposed between the mixer and the opening for removing the material from the device.

In testimony whereof I have signed my name to this application.

EDWARD O. FLEEK.